United States Patent [19]

Sergeant et al.

[11] Patent Number: 5,107,286
[45] Date of Patent: Apr. 21, 1992

[54] ENVIRONMENTALLY SEALED CAMERA HOUSING

[75] Inventors: Ronald G. Sergeant, Lewisville; Karl E. Zemlin, Greensboro; Jonathan D. Hauser, Mt. Airy, all of N.C.

[73] Assignee: Burle Technologies, Inc., Wilmington, Del.

[21] Appl. No.: 587,015

[22] Filed: Sep. 24, 1990

[51] Int. Cl.⁵ .................. G03B 17/08; H04N 7/18
[52] U.S. Cl. ................................... 354/64; 358/99
[58] Field of Search .................. 354/64, 81, 288; 358/99, 100

[56] References Cited

U.S. PATENT DOCUMENTS

| | | | |
|---|---|---|---|
| 2,849,530 | 8/1958 | Fleet | 358/100 |
| 2,963,543 | 12/1960 | Link et al. | 358/99 |
| 3,065,666 | 11/1962 | Sampson | 354/64 |
| 3,715,484 | 2/1973 | Latall | 358/100 |
| 4,051,523 | 9/1977 | Laikin et al. | 358/99 |
| 4,080,629 | 3/1978 | Hammond et al. | 358/229 |
| 4,281,343 | 7/1981 | Monteiro | 358/99 |
| 4,295,721 | 10/1981 | Rebiloff | 354/64 |
| 4,485,398 | 11/1984 | Chapin et al. | 358/99 |
| 4,650,634 | 3/1987 | Meuschke et al. | 358/100 |
| 4,855,838 | 8/1989 | Jones et al. | 358/100 |
| 4,961,111 | 10/1990 | Herlitz et al. | 358/100 |

Primary Examiner—Donald A. Griffin
Attorney, Agent, or Firm—Martin Fruitman

[57] ABSTRACT

A sealed and pressurized housing for a TV camera. The camera is mounted on a cradle which includes the sealing mechanism for both ends of the housing. Both ends are sealed with conventional "O" ring seals and end plates which are secured to the cradle. Since pressure is always equalized against both end plates and they are mechanically connected, when the housing is opened, no parts can be dangerously propelled upon release of the pressure. The cradle is also mounted so that, despite the internal pressure, it can be rotated relative to the fixed outer casing in order to adjust the angle of the camera to the horizontal.

8 Claims, 2 Drawing Sheets

ENVIRONMENTALLY SEALED CAMERA HOUSING

SUMMARY OF THE INVENTION

This patent deals generally with television and more specifically with a television camera enclosure or housing which protects a camera from damage by the environment within which it is placed.

Environmentally or hermetically sealed television camera housings are not at all uncommon. Since television cameras are electronic systems, and moisture and dirt can cause the electronic components to deteriorate or fail, it is standard procedure to protect television cameras from such hazards if exposure to them is expected. Therefore, there are numerous patents issued which show enclosures to protect TV cameras from damage when they are located underwater or in hazardous locations, such as deep within wells or in sewer pipes.

Most of these hermetically sealed housings have several features in common. One feature which they share is sealed openings. In the typical housing, which usually approximates the shape of a cylinder, there is one sealed end with a transparent window through which the camera can view the region outside the housing and another sealed end through which the electrical signals feed into and out of the housing. These sealed ends are individually held in place by such common means as welded seams, screw threads or snap rings, and, if the ends are removable, they also usually include a sealing means such as an "O" ring.

Another feature common to many hermetically sealed housings is that they are pressurized with a slight pressure of air or inert gas. Such an arrangement assures that no foreign matter will leak into the housing since the excess pressure already within it will preferentially leak out instead.

One feature that few housings have is any system for rotating the housing or camera relative to a fixed mounting arrangement so that the orientation of the camera can be adjusted for its angle to the horizontal. This may be largely due to the fact that most environmentally sealed housings anticipate use as a hand held device, and therefore there is no fixed mounting and no adjustment is required. One system which does use a fixed mounting simply uses large hose clamps to attach the cylindrical casing to the mounting fixture, and requires loosening of the clamps to rotate the entire housing, with the camera enclosed, when the horizontal angle is to be adjusted.

There is also a safety problem involved with the use of sealed and pressurized housings. That is the danger that the housing will be opened without first releasing the pressure. While all such housings have a pressure release valve, usually the same valve which is used to pressurize the housing in the first place, inexperienced or forgetful personnel may not release the pressure before opening the housing. In such a situation, the pressure within the housing may suddenly release and may propel the end cap being removed, or some other components, away from the housing with considerable, and dangerous, velocity.

The present invention eliminates that danger, and also includes a structure which permits the casing to be permanently attached to a mounting, while permitting the camera to be rotated relative to the casing, when the camera is still within the sealed casing. Therefore, the housing can be located and attached without concern for the camera's angle to the horizontal, and the camera can be adjusted after the mounting effort is completed.

This is accomplished by mounting the camera on a structural cradle which fits within the environmentally sealed casing, with both end caps of the casing also attached to the cradle, rather than independently attached to the ends of the casing. In the preferred embodiment, the casing is a simple cylinder with open ends, and the camera cradle has two end fixtures which fit against and seal the cylinder's ends as the cradle is pushed into and fitted tightly within the casing.

To accomplish this, the ends of the casing are sealed from the inside by conventional "O" ring seals which are contacted by the two end caps attached to the cradle.

It should be apparent that when the ends are sealed by caps which are mechanically connected together, the caps at the ends of the housing will always have the same outward force from the internal air pressure applied to them, regardless of whether the housing is sealed or if only the seal at one end of the housing is broken. Moreover, with no other structure against which any air pressure generated force can react, no components can be dangerously propelled away from the housing.

To accomplish this result, the casing is constructed so that the inside diameter of the casing has grooves near each end opening with an "O" ring held within each groove and against the inside surface of the casing. The end caps of the cradle then fit against each "O" ring and form the seal when the cradle is fully inserted into the casing.

The cradle itself has the transparent window for the housing sealed to the cap at one end so that the window will be located near one of the sealed openings, and although it is not absolutely necessary, it is convenient to locate the electrical connections to the camera so that they feed through the other cap. In that manner the camera can be completely connected and even tested before the cradle is placed into the housing.

The horizontal angle adjustment of the camera which is accomplished by rotating the cradle and camera relative to the casing can be accomplished quite simply by merely turning the cradle relative to the casing, even after the housing has been sealed and pressurized. Although the pressure seals are maintained by the surfaces of the end caps on the cradle compressing the "O" rings against the surfaces of the casing, this force is not enough to lock the mating parts in place at the seals. That is, the clearances and dimensions of the seals can be chosen so that parts can be rotated relative to each other while there is still no loss of the internal pressure at the seals.

The invention is therefore able to furnish a hermetically sealed, pressurized TV camera housing which not only permits the camera within it to be rotated relative to the casing, but also eliminates the danger that the pressurized housing will propel parts away from it when the pressurized seal is opened.

DETAILED DESCRIPTION OF THE INVENTION

Figure 1:
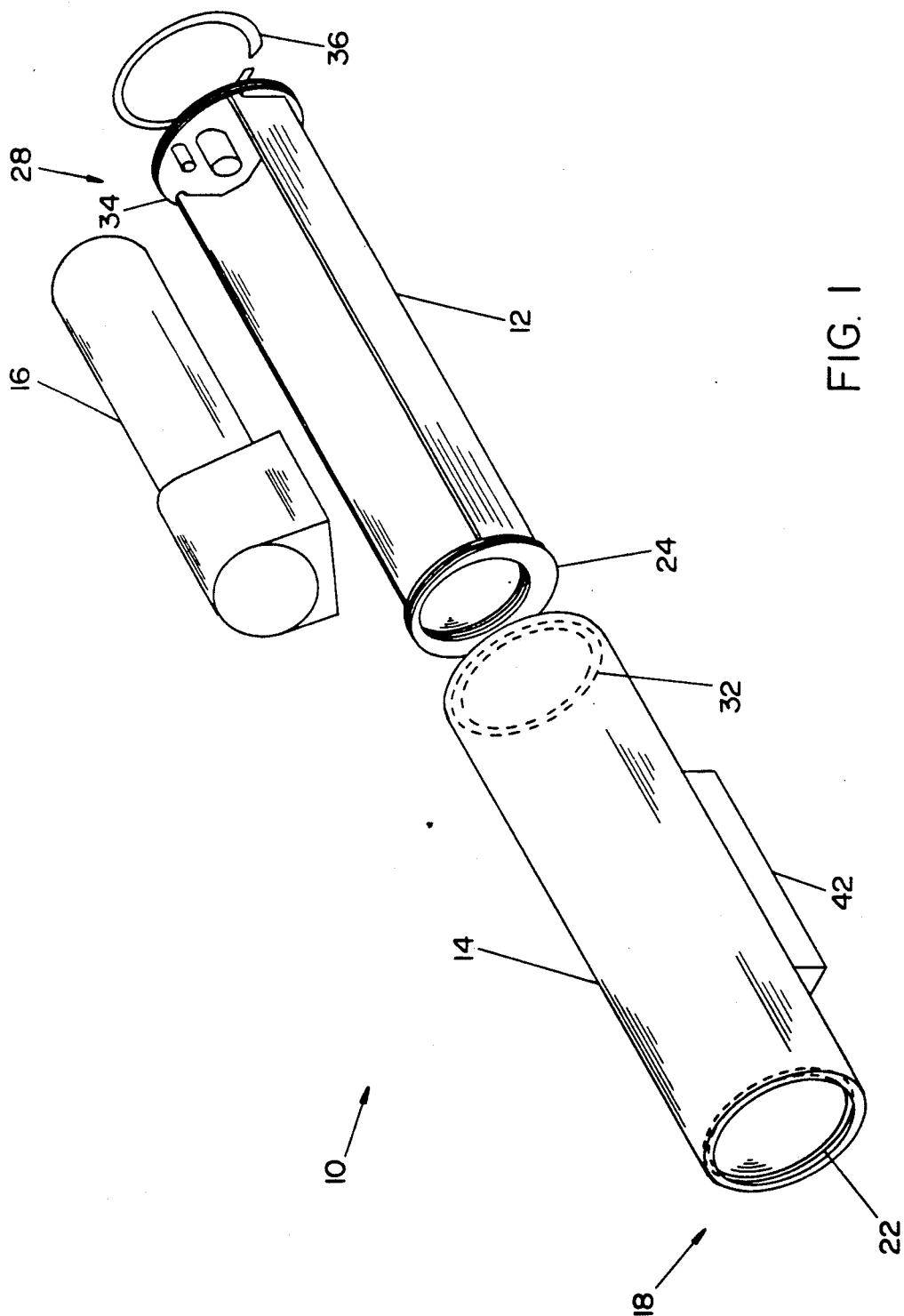
FIG. 1 is a perspective view of the preferred embodiment of the sealed camera housing shown partially disassembled.

The preferred embodiment of the invention is shown in FIG. 1 in which environmentally sealed camera housing 10 is shown with cradle 12 removed from casing 14 and with camera 16 lifted off of cradle 12.

Casing 14 is shown as a simple cylinder, although its particular geometry has no effect on the present invention. The important feature of casing 14 is that it must be constructed as a leak tight enclosure which is capable of being pressure sealed at opposite ends of its structure and that its end plates, 24 and 34 must be mechanically interconnected.

Figure 2:
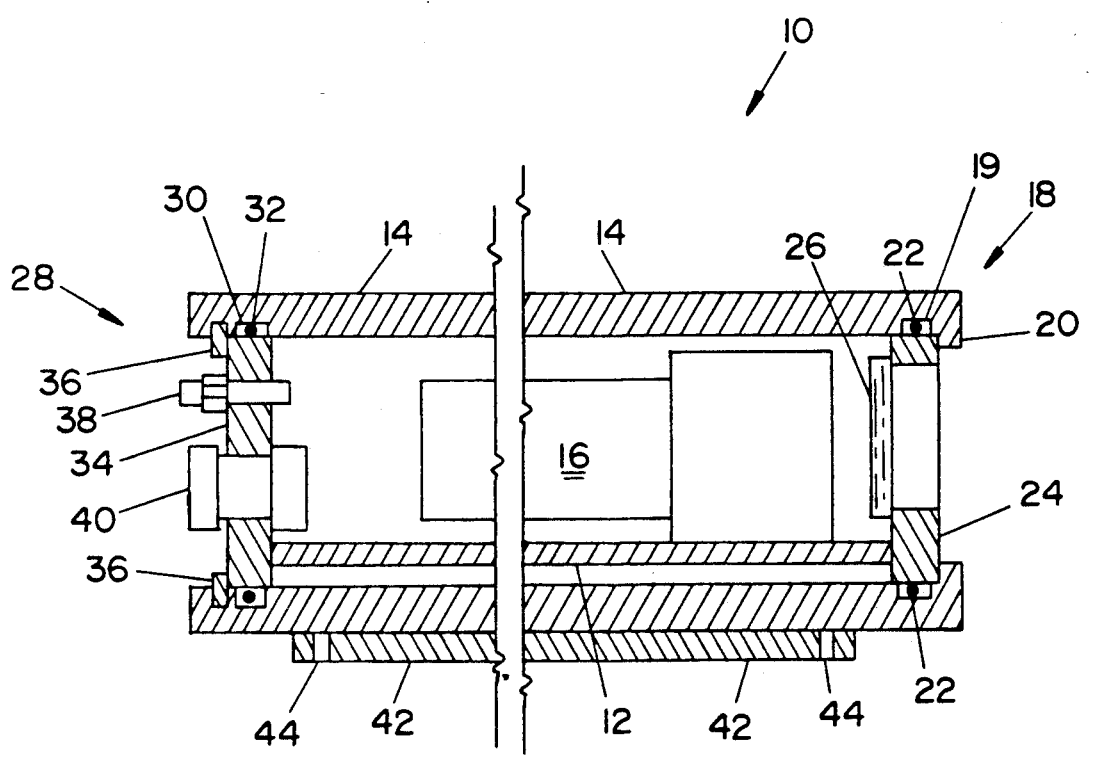
FIG. 2 is a simplified cross section view of the preferred embodiment of the invention taken through the axis of the sealed housing.

The sealing arrangement at the ends of enclosure 14 can be quite conventional. As shown in FIG. 2, which is a simplified cross section of housing 10 taken through its axis, end 18 is constructed with ring 20 formed on the inside surface of cylinder 14 as a barrier against which cradle 12 rests. "O" ring 22 is then placed just inside ring 20 within groove 19 so that front cap 24 of cradle 12 will create the pressure seal by pressing against "O" ring 22 when cradle 12 is placed into casing 14 and pushed forward. Window 26 has been sealed to front cap 24 by conventional methods during the previous assembly of cradle 12, so that once cradle 12 is locked in place, end 18 of housing 10 is environmentally and pressure sealed.

In the preferred embodiment of the invention, as shown in FIG. 2, cradle 12 is locked in place by the structure at rear end 28 of housing 10 where the second of the pressure seals is also located.

The second seal is assembled at groove 30 formed in casing 14, where "O" ring 32 is placed within groove 30 and compressed by rear cap 34. Rear cap 34 is locked into place by snap ring 36, thus locking the entire structure of cradle 12, and camera 16 which is mounted upon it, into casing 14.

It is important to note that, with front cap 24 and rear cap 34 interconnected through the structure of cradle 12, the forces of the pressurized air within housing 10 act equally upon both caps and are directed outward, so that the forces at the opposite ends counteract each other. Therefore, at the opening of pressurized housing 10, no violent propulsion of components can take place.

Housing 10 is pressurized with air or an inert gas through conventional gas valve 38, and while valve 38 should also be used to relieve the pressure within housing 10 before opening it up, the present invention assures that no dangerous situation will develop if an operator forgets the pressure relief step when disassembling the housing.

FIG. 2 also shows conventional pressure sealed electrical connector 40 through which the necessary electrical connections are fed to camera 16.

The seals at ends 18 and 28 of housing 10 as included in the preferred embodiment of the invention furnish another valuable benefit. Since it is advantageous in many applications to permanently attach housing 10 to a fixed support structure (not shown), attachment means 42 with threaded bolt holes 44 is furnished for this purpose. However, when housing 10 is permanently attached to a support structure, it is sometimes necessary to adjust the orientation of the angle of camera 16 to the horizontal by rotating the camera relative its connection to the fixed support structure.

In the preferred embodiment of the invention this is accomplished quite easily due to the structure of the pressure seals. To adjust the angle of camera 16 to the horizontal, it is only necessary to grip cradle 12, usually by the use of protrusions such as valve 39 and electrical connector 40, and to turn cradle 12 relative to casing 14. Of course, camera 16, which is mounted on cradle 12 also turns when cradle 12 does, and the angle of camera 12 to the horizontal is thereby adjusted.

This rotating action, although it requires some force, is surprisingly easy because it is the "O" ring surfaces at which the movement takes place, and because of the smooth surface and low friction characteristics which conventional elastomer "O" rings have. Moreover, the normal elasticity of the "O" rings will continue to maintain the pressure seals within casing 14 even during the sliding action at the surfaces during the rotation.

The present invention therefore furnishes two benefits which have not heretofore been available in hermetically sealed camera housings. The invention protects the user against accidents caused by opening the pressurized casing without first relieving the internal pressure, and it allows the camera's orientation to the horizontal to be adjusted without tools or any disassembly.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other types of seal structures could be used, such as placing the "O" rings on the circumference of one or both of the end caps so that the "O" ring seals against the inside surface of casing 14. Moreover, casing 14 and cradle 12 could have other configurations.

What is claimed as new and for which Letters patent of the United States are desired to be secured is:

1. A pressurized camera housing which permits safely opening the pressurized housing comprising:
   a leak tight casing with at least two separated closable openings;
   an internal structure which fits within the casing and to which are attached closure means for each of at least two separated openings, the closure means being located on the internal structure with a fixed separation so that they move together and act to simultaneously close and open the openings with which each closure means is associated;
   sealing means to seal the closable openings; and
   means to pressurize the housing with a gas when the closable openings are sealed.

2. The camera housing of claim 1 wherein one of the openings is constructed and located to serve as the access opening through which a camera is placed within the housing.

3. The camera housing of claim 1 wherein the internal structure is constructed to accept and hold a camera.

4. The camera housing of claim 1 wherein the internal structure is constructed so that it may be removed and separated from the casing.

5. The camera housing of claim 1 wherein one closure means is adjacent to a transparent window attached to the internal structure.

6. The camera housing of claim 1 where the closable openings are located at opposite ends of the casing.

7. The camera housing of claim 1 wherein the casing is an elongated structure with circular closable openings at opposite ends of the casing; the sealing means are seals constructed with "O" rings; and the internal structure is a rotatable cradle to which a camera can be attached.

8. A camera housing comprising:
  a leak tight casing with at least two separated closable openings; and
  an internal structure which fits within the casing and to which are attached closure means for each of at least two separated openings, the closure means being located on the internal structure so that they each act to close and open the openings with which each closure means is associated; wherein the internal structure is constructed so that it can be rotated relative to the casing while the closable openings are sealed and while maintaining the sealed condition.

* * * * *